L. C. PALMER.
COATING MECHANISM.
APPLICATION FILED APR. 11, 1916.

1,252,019.

Patented Jan. 1, 1918.
4 SHEETS—SHEET 1.

WITNESSES
C. F. Volk
M. A. Meyer.

INVENTOR
L. C. Palmer
BY
Dull, Warfield & Dull
ATTORNEYS

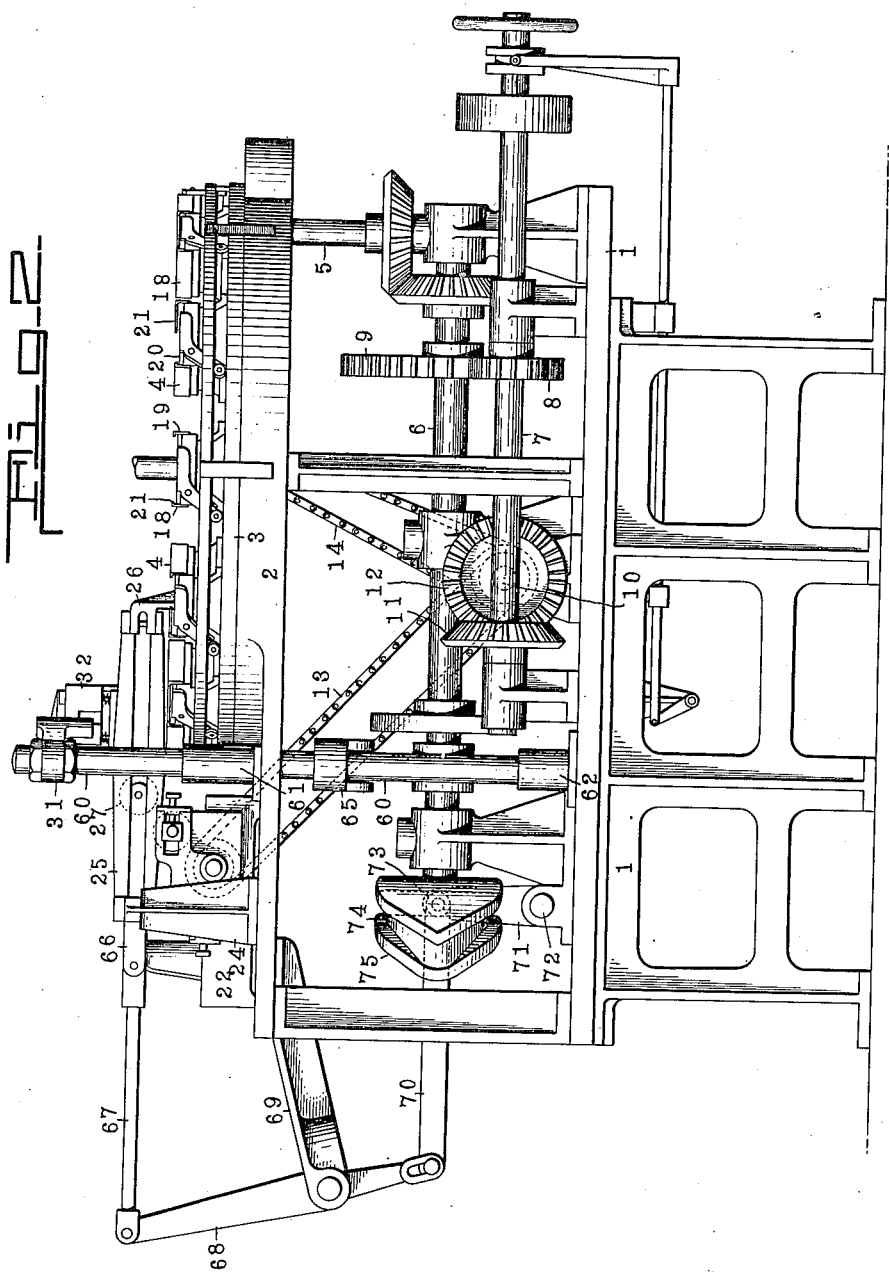

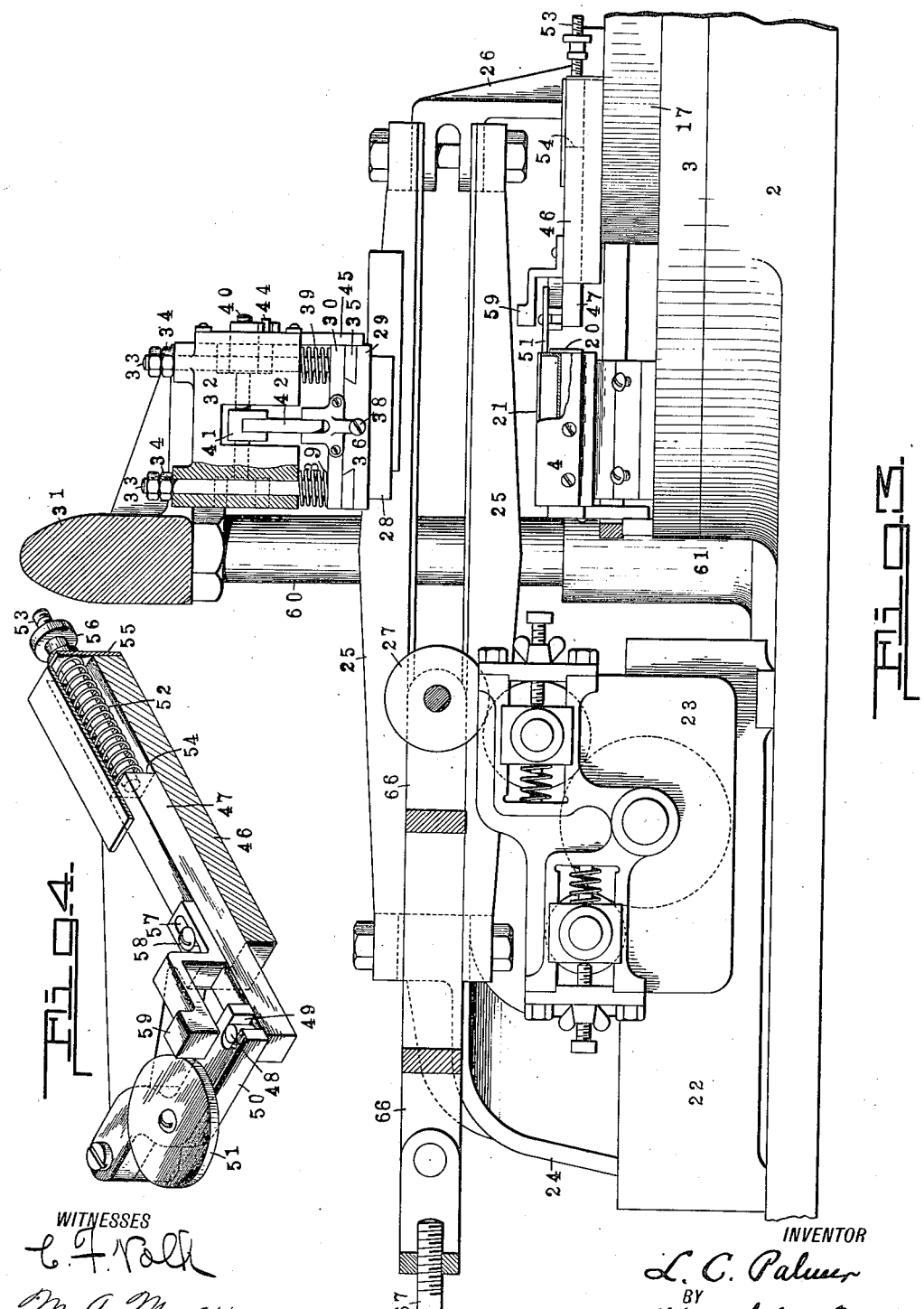

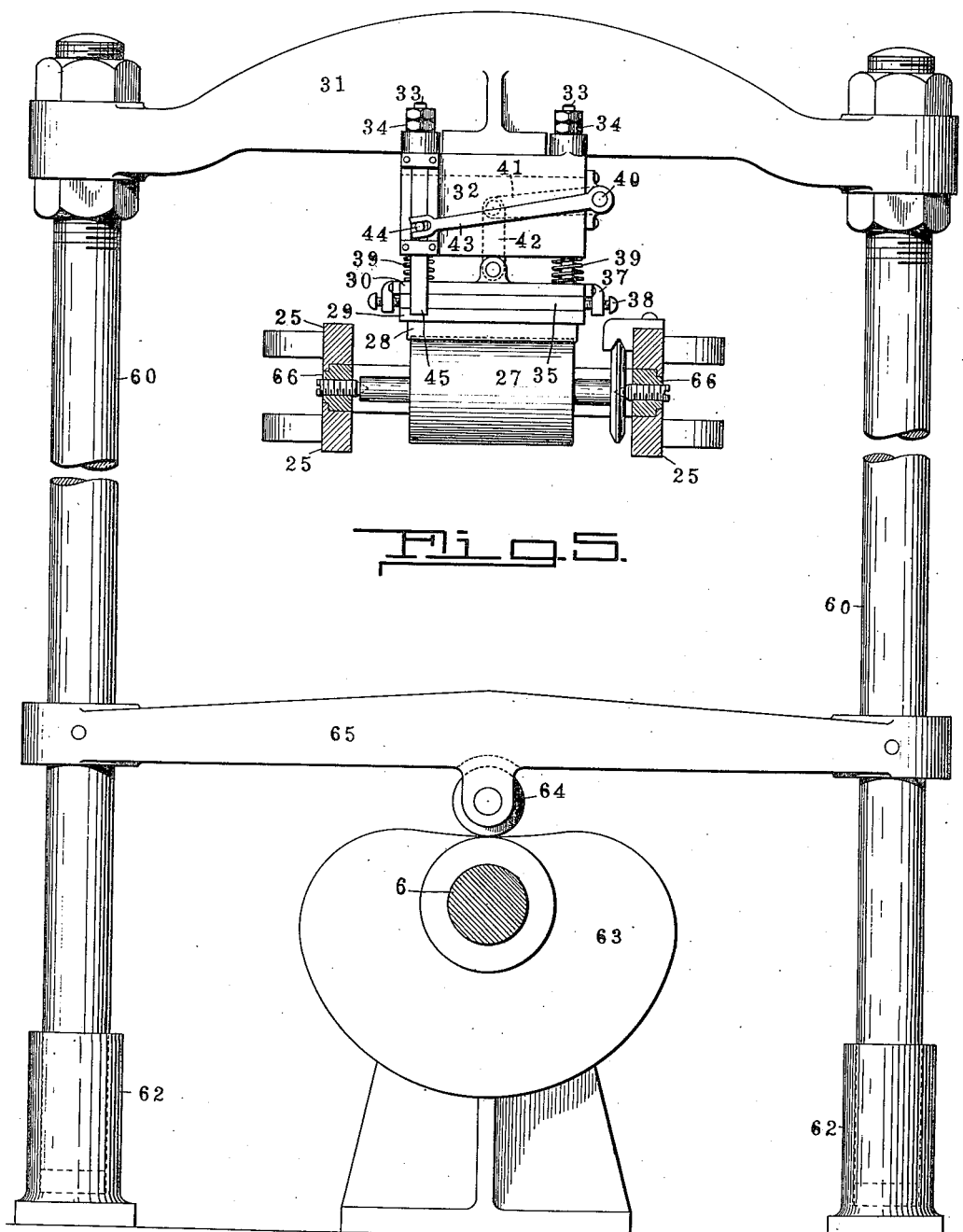

UNITED STATES PATENT OFFICE.

LYNDON C. PALMER, OF BUFFALO, NEW YORK, ASSIGNOR TO F. N. BURT COMPANY, LIMITED, OF BUFFALO, NEW YORK, A CORPORATION OF ONTARIO, CANADA.

COATING MECHANISM.

1,252,019.      Specification of Letters Patent.      Patented Jan. 1, 1918.

Original application filed December 9, 1911, Serial No. 664,774. Divided and this application filed April 11, 1916. Serial No. 90,410.

*To all whom it may concern:*

Be it known that I, LYNDON C. PALMER, a citizen of the United States, residing at Buffalo, in the county of Erie and State of New York, have invented certain new and useful Improvements in Coating Mechanism, of which the following is a full, clear, and exact description, such as will enable others skilled in the art to which it appertains to make and use the same.

This invention relates to coating machines, and with respect to its more specific features to machines of the character referred to adapted to coat articles with adhesive.

One of the objects of the invention is the provision of mechanism for efficiently coating a surface of a box, especially an inside surface thereof.

Another object of the invention is to provide a device in which the adhesive is accurately and economically applied to the parts to be glued with little waste and without gumming up adjacent parts.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification and wherein similar reference characters refer to similar parts throughout the several views,—

Fig. 2 is a side elevation of Fig. 1;

Fig. 3 is an enlarged view, in section, of a portion of the machine shown in Fig. 1; and Figs. 4 and 5 are detail views of portions of the machine.

Figure 1:
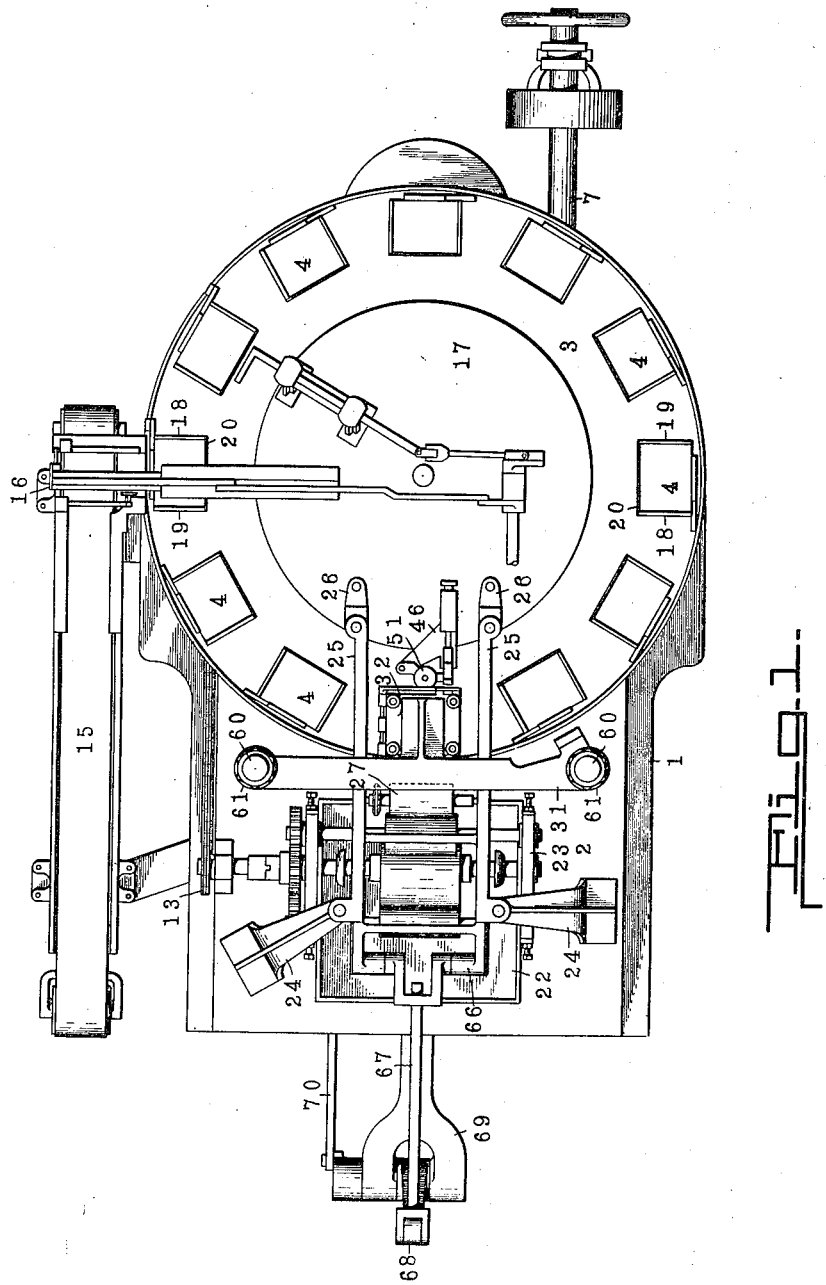
Figure 1 is a plan view of a machine embodying the invention.

This application is a division of a prior application, Ser. No. 664,774, filed December 9, 1911, to which reference may be made for a disclosure of the complete machine. For the purposes of the present application it will be sufficient to only briefly describe the general construction and operation of the machine, the specific description being confined more especially to that part of the invention to which this application is particularly directed.

The numeral 1 indicates a stand, above which is supported a horizontally disposed bed plate 2, on which is rotatably mounted a box supporting and carrying table or disk 3. On the upper surface of the table 3, which table may be regarded as an endless carrier, is a series of box supports or rests 4, each of which rests is adapted to support a box open face up, so that the inner face or inside bottom faces of the boxes may be coated with adhesive, such as glue. The carrier 3 is intermittently rotated so as to dispose the box rests opposite certain gluing and other devices between the intervals of its rotation, and intermittent motion is communicated to the carrier 3 through the instrumentality of a vertical shaft 5 driven from a horizontally disposed continuously rotating cam shaft 6, to which motion is communicated from a main driving shaft 7 through the instrumentalities of gears 8 and 9. The numeral 10 indicates a counter-shaft driven from the shaft 7 by the bevel gears 11 and 12, and having on one end sprocket wheels driving sprocket chains 13 and 14, one of these chains, as 13, being arranged to operate certain glue supplying rollers, and the other, as 14, being arranged to operate certain conveyer mechanism. The conveyer mechanism is indicated by the numeral 15, and comprises an endless belt moving in a trough, which belt conveys the boxes into position to be moved onto the box rests 4 by means of a reciprocatory picker 16, motion being communicated to the belt 15 by the sprocket chain 14. Above the rotary disk 3 and supported by the bed plate 2 is a stationary platform 17 adapted to serve as a support for certain parts of the machine. In order to provide for the accurate positioning of the boxes with their upstanding flanges on the rests 4, the latter are provided with peripheral projections in the shape of flanges 18, 19 and 20, and, as by the present embodiment provision is made for labeling substantially rectangular boxes, three sides of the rest are provided with flanges, angularly arranged relative to each other, the fourth side being left free and providing an intervening opening, so that a box may be slid or transferred from the conveyer belt 15 onto the box rest, on which it will be guided and positioned by said flanges. In order that the boxes shall be prevented from substantial displacement in a plane perpendicular to that of the rest, the opposite flanges 18 and 19 are provided with overhanging portions 21, which span the thickness of the box flanges. The inner flange 20 serves as a stop to limit the radial position of the box relative to the rest and the carrier on which it is supported, and this stop terminates below the top of the box flange and is unprovided with an overhanging flange, for purposes which will hereinafter appear. The flanges of the rest are accordingly spaced from each other peripherally of the rest to a sufficient extent to permit a box to be drawn from the conveyer into the chamber of the rest formed by the flanges aforesaid. A box having been fed onto the support or rest by the picker mechanism, referred to, the carrier is rotated to convey the box to a position in which glue is applied thereto.

The bed plate 2 extends sufficiently to one side of the carrier plate to support a glue reservoir comprising a tank 22 having upstanding plates 23 supporting glue supply and delivery rollers of the general character disclosed in applicant's Patent, No. 1,019,351, March 5, 1912. Brackets 24, secured to the bed plate, support at one end guide rods 25 extending across the path of the box rests, the other ends being supported by brackets 26 secured to the central stationary platform 17. A glue-applying roller 27 is guided between the bars of said rods and carries glue from the delivery roller to a glue pad 28 supported in line with a stationary position assumed by the box rests. The manner of supporting the guide rods and the guiding devices whereby the glue-applying roller is moved from the glue supply to the pad are generally similar to those described in the aforesaid patent. The glue pad 28 comprises preferably a rubber block covered with canvas and held in a plate 29 adjustably mounted in another plate 30 resiliently supported upon a cross head 31 to reciprocate toward and from the plane of rotation of the carrier in order to deliver glue to a box supported on a rest beneath the same. In the present embodiment the cross head 31 is provided with a bracket comprising a block 32 through which pass guiding and supporting pins 33 provided with stop nuts 34 at their upper ends, the lower ends of the rods being attached to the plate 30, to the bottom of which latter are fastened undercut guide plates 35 forming a dove-tailed channel adapted to be slidingly engaged by a projecting portion 36 of the plate 29 carrying the pad 28. The plate 30 is provided with depending brackets 37 through which pass adjusting screws 38 which abut the ends of the pad-carrying plate so as to permit the transverse adjustment of the pad relative to its support and also relative to the box rests. Between the plate 30 and the block 32 and surrounding the pins 33, resilient means, as springs 39, are interposed, and as the cross head is operated the glue pad descends toward the box rests, being adapted to enter between the flanges of the box therebeneath and glue the inner bottom face or surface thereof with a yielding pressure, as will now be apparent.

In order to prevent the pad applying glue to the surface of the rest 4, should no box be in position thereon, a rock shaft 40 is journaled on the side of the block 32 and centrally connected by an arm 41 and link 42 to the plate 30. An arm 43 on the end of the shaft 40 has a forked end engaging a pin 44 of a square detent rod 45 mounted to reciprocate in the block. Supported on the central platform 17 is a base bracket 46, supporting a sliding rod 47, preferably of rectangular cross section, having a pin 48, engaging a slot 49 in one end of a lever 50 pivoted at its other end to an arm of the bracket 46 and carrying a cam in the shape of an anti-friction roller 51, located in a horizontal plane on a line with the lateral wall of a box when in position on a rest, said roller being moved by a spring 52 to intersect the path of the box wall, and adapted to be pressed away from the rest by said wall as the box passes. Preferably, the rod 47 has a reduced portion comprising a stem 53 forming a shoulder 54 and the spring 52 encircles the stem 53, and lies between the shoulder 54 and a removable plate 55 fastened to the bracket, a nut 56 engaging a threaded portion of the stem 53 and serving to adjust the position of the roller 51 relative to the box rest. To the rod 47 is adjustably secured, as by a slot 57 and screw 58, an arm forming a stop 59 projecting beyond the bracket and above the plane of the box rest, and the spring 52 urges the stop 59 into position beneath the rod 45 when no box is in position to be glued. Under this condition the lower end of rod 45 strikes the stop 59 before the glue pad 29 has descended sufficiently to touch the rest, and full movement of the block 32 is permitted without further descent of the pad. When a box is in position on the rest, the roller 51 will engage the wall of the same just above the inner flange 20 of the rest, which it will be remembered does not extend the full height of the box, and thus the stop 59 is kept out of alinement with the rod 45 and full descent of the glue pad into the box is permitted. The slot and screw connection with the nut 56 enables the tension of spring 52 to be regulated, though the stop 59 be adjusted to different positions relative to the path of the box.

In applying labels to boxes it is desirable to produce an article having a finished appearance, one in which the label lies smoothly, and without air bubbles or wrinkles and one in which the label is accurately arranged with respect to the article to which it is attached. To this end the glue should be applied in definite places, and the label should be affixed so as to register as accurately as possible with the glued portion of the article. These objects are efficiently attained by supporting the glue pad on rods connected thereto at opposite sides of the pad, as by supporting and guiding rods 60 attached to each end of the cross-head 31, and guided in elongated bearings 61 and 62 on the bed plate 2 and stand 1, respectively. Reciprocatory motion is communicated to the glue pad through the cross-head 31 by a cam 63 secured to shaft 6, and engaging a roller 64 on a tie bar 65 connecting the rods 60.

Referring to the operation of the glue-applying roller 27, it is deemed preferable to move this roller back and forth over the glue pad for each gluing operation of said pad, and in order to efficiently accomplish this operation the roller 27 is journaled in a longitudinal frame 66, adapted to reciprocate in the guides 25 which are disposed between the guide rods 60 of the cross head below said head and across the path of the box rests. The roller 27 thus moves in line with the space between the rods 60 and glue is applied to the pad uniformly, there being practically no tendency of either the pad or the roller to rock on their supports, which might result in a greater thickness of glue on one side of the pad than on the other. The frame 66 is operated through a connecting rod 67 pivotally joined to the frame 66 at one end, the other end of the rod being pivotally connected to the end of one arm of a rock lever 68 fulcrumed in a fixed bracket 69, the other arm of the lever 68 being adjustably pivotally connected to one end of a connecting rod 70. The opposite end of the rod 70 is pivotally connected to an arm 71 of a rock shaft 72 journaled in bearings fastened to the machine frame, and an anti-friction roller 73 projects laterally from the arm 71 into a groove 74 of a cam 75 fastened to the shaft 6. The groove of this cam is so designed that for each rotation of the shaft 6 a complete positive reciprocation of the roller 27 will be effected, with an intervening period of rest when said roller is being supplied with glue from the rollers of the reservoir.

The operation will be largely apparent from the above description, but may be briefly described as follows:

The operator places boxes on the belt 15 open side up, whereupon they will be conveyed into the path of the picker 16, which will transfer them to the respective supports or rests 4 as these latter present themselves opposite the belt. The rotation of the table 3 will carry the rests 4 one by one to glue-applying position beneath the glue pad 28, and said pad will descend and enter the box from above and apply glue to the inside bottom face of the box. Should there be no box upon a rest 4, the spring 52 will urge the stop 59 into position directly beneath the detent 45, and when the pad descends toward the rest, the detent 45 will contact the stop 59 before the pad 28 will have descended sufficiently to contact with the upper face of the rest 4, and thus glue will not be applied to the upper face of the rest. When a box is in position on a rest approaching position to be glued, the side wall or flange of the box will contact the roller 51 and wipe it aside, thus causing the lever 50 to move the rod 47 in a direction to carry the stop 59 out of position directly beneath the detent 45. Under this condition the full descent of the pad 28 is permitted, and the box on the rest will be coated with the adhesive on its inside bottom face, as will be apparent.

Thus by the above described construction are accomplished, among others, all of the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a matter of language, might be said to fall therebetween.

Having described my invention, what I claim as new and desire to secure by Letters Patent is:

1. In an apparatus of the character described, in combination, a yieldingly supported glue carrying surface, a support for an article to be glued, means adapted to cause relative approaching movement between said surface and support to apply glue to an article on said support, and means adapted to adjust said surface transversely of the path of said movement.

2. In an apparatus of the character described, in combination, a glue carrying surface, a support for an article to be glued, means adapted to cause relative approaching movement between said surface and support to apply glue to an article on said support, means movable to and from a position to limit the extent of said relative movement so as to prevent contact between said glue carrying surface and said support and means, controllable by the presence or absence of an article on said support to determine the position of said limiting means.

3. In an apparatus of the character described, in combination, a glue carrying surface, a support for an article to be glued, means adapted to cause relative approaching movement between said surface and support to apply glue to an article on said support, means adapted to adjust said surface transversely of the path of said movement, and means adapted to limit the extent of said relative movement so as to prevent contact between said glue carrying surface and said support.

4. In an apparatus of the character described, in combination, a yieldingly supported glue carrying surface, a support for an article to be glued, means adapted to cause relative approaching movement between said surface and support to apply glue to an article on said support, means adapted to adjust said surface transversely of the path of said movement, and means adapted to limit the extent of said relative movement so as to prevent contact between said glue carrying surface and said support.

5. In an apparatus of the character described, in combination, a support, movable pins passing therethrough, means to limit the movement of the pins in one direction, a plate having a dovetail channel and carried by said pins, means to yieldingly resist movement of the plate toward the support, a second plate adapted to slidingly engage the channel in the plate, a pad carried by the second plate, and adjusting devices supported by the first plate and adapted to secure the second plate in position.

6. In an apparatus of the character described, in combination, a support, movable pins passing therethrough, means to limit the movement of the pins in one direction, a plate having a dovetail channel and carried by said pins, means to yieldingly resist movement of the plate toward the support, a second plate adapted to slidingly engage the channel in the first plate, a pad carried by the second plate, brackets carried by the first-mentioned plate, and adjusting screws supported by the brackets and adapted to engage the second-mentioned plate.

7. In an apparatus of the character described, in combination, a glue supply roller, a glue-applying roller, a movable box support, a box conveyer, means to transfer a box from the conveyer to the box support, a driving shaft, a counter-shaft, a cam shaft, operating connections between the driving shaft and the counter-shaft and cam shaft, a cam on the cam shaft, means operated by the cam for positively reciprocating the glue-applying roller, sprocket driving connections between the counter-shaft and the glue delivery roller and the conveyer, and means coöperating with the cam shaft to intermittently move the box support.

8. In an apparatus of the character described, in combination, a glue pad, rods connected thereto at opposite sides of the pad, and means to reciprocate said rods.

9. In an apparatus of the character described, in combination, a glue pad, guide rods connected thereto at opposite sides of the pad, a glue reservoir, means comprising a glue-applying roller movable between the reservoir and the pad in line with the space between the rods, means to reciprocate said rods, and means to operate the applying roller.

10. In an apparatus of the character described, in combination, a series of box rests, means to move the rests intermittently to glue-applying position, a cross head comprising spaced guide rods, a glue pad mounted on said head intermediate the rods, means to move the rods toward and from the rest in glue-applying position, and means movable in line with the space between the rods and adapted to apply glue to the pad between the several movements of the rests into glue-applying position.

11. In an apparatus of the character described, in combination, a plurality of box supports, a glue carrier, means to move the supports one by one into alinement with the carrier, means to move the carrier toward and from the support in alinement, and means adapted to vary the stroke of the carrier.

12. In an apparatus of the character described, in combination, a box support, a glue pad support, means to reciprocate the glue pad support toward and from the box support, a glue pad movably mounted on the pad support, a detent connected to said pad, and a stop adapted to move into and out of the path of the detent to control the extent of movement of the pad.

13. In an apparatus of the character described, in combination, a plurality of box supports, a glue pad support, a glue pad movably mounted on the pad support, means to move the box supports one by one into glue-applying position relatively to the pad, means to reciprocate the pad toward and from the box support in position, a detent connected to the pad, a movable stop adapted to prevent the pad contacting the box support, and means adapted to automatically maintain the stop in the line of movement of the detent when no box is in position on the support.

14. In an apparatus of the character described, in combination, a plurality of box supports, a glue pad support, a glue pad movably mounted on the pad support, means to move the box supports one by one into glue-applying position relatively to the pad, means to reciprocate the pad toward and from the box support in position, a detent connected to the pad, a movable stop adapted to prevent the pad contacting the box support, means adapted to automatically maintain the stop in the line of movement of the detent when no box is in position on the support, and cam means adapted to contact a box and remove the stop from the line of movement of the detent.

15. In an apparatus of the character described, in combination, an endless carrier, a plurality of means mounted thereon adapted to stationarily position boxes open side up, a glue carrier adapted to enter the boxes and apply glue to the interior of a wall thereof, and means adapted to limit the movement of the carrier to a point above the position assumed by a box when no box is in gluing position on the carrier.

16. In an apparatus of the character described, in combination, an endless carrier, a plurality of means mounted thereon adapted to stationarily position boxes open side up, a glue carrier adapted to enter the boxes and apply glue to the interior of a wall thereof, a detent carried thereby, a stationary support, a stop carried thereby, a cam connected to the stop, and means to yieldingly hold the cam in the path of the boxes on the carrier and the stop in the path of the detent.

17. In an apparatus of the character described, in combination, a support, guiding and supporting pins movably mounted thereon, a plate carried by said pins, springs adapted to resist relative movement of said plate and support toward each other, a glue pad carrying plate carried by said first mentioned plate and movable transversely of the path of said relative movement, and adjusting devices carried by one of said plates adapted to secure said glue pad carrying plate in position relative to said other plate.

18. In an apparatus of the character described, in combination, a support for an article to be coated, coating means, means adapted to cause relative approaching and receding movements between said support and said coating means, and means adapted to limit the amount of said approaching movement comprising a slidable stop rod, a spring adapted to urge said rod toward stopping position, a pivoted arm having a slot, an anti-friction roller on said arm adapted to coöperate with an article on said support, and a pin on said rod in engagement with said slot.

19. In an apparatus of the character described, in combination, a support for an article to be coated, coating means, means adapted to cause relative approaching and receding movements between said support and said coating means, and means adapted to limit the amount of said approaching movement comprising a slidable stop rod, a spring adapted to urge said rod toward stopping position, means to adjust the tension of said spring, a pivoted arm having a slot, an anti-friction roller on said arm adapted to coöperate with an article on said support, and a pin on said rod in engagement with said slot.

In testimony whereof I affix my signature, in the presence of two witnesses.

LYNDON C. PALMER.

Witnesses:
HAROLD C. COPPINS,
JAS. O. HOLMES.